(12) United States Patent
Mo et al.

(10) Patent No.: US 12,130,770 B2
(45) Date of Patent: Oct. 29, 2024

(54) APPARATUS FOR SYNCHRONOUS ETHERNET

(71) Applicant: Alpha Networks Inc., Hsinchu (TW)

(72) Inventors: Pao-Kang Mo, Hsinchu (TW); Chien-Hua Wang, Hsinchu (TW); Cheng-Tai Tien, Hsinchu (TW); Shih-Feng Tseng, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 21 days.

(21) Appl. No.: 18/125,483

(22) Filed: Mar. 23, 2023

(65) Prior Publication Data

US 2023/0418779 A1 Dec. 28, 2023

(30) Foreign Application Priority Data

Jun. 22, 2022 (TW) .................................. 111123228

(51) Int. Cl.
*G06F 13/42* (2006.01)
(52) U.S. Cl.
CPC .. *G06F 13/4291* (2013.01); *G06F 2213/0016* (2013.01); *G06F 2213/0026* (2013.01)
(58) Field of Classification Search
CPC ......... G06F 13/4291; G06F 2213/0016; G06F 2213/0026; H04J 3/0635; H04J 3/0667
See application file for complete search history.

(56) References Cited

U.S. PATENT DOCUMENTS

| | | | |
|---|---|---|---|
| 9,088,403 B1* | 7/2015 | Caggioni | H04J 3/0658 |
| 9,088,408 B2* | 7/2015 | Campagna | H04W 12/0431 |
| 10,763,865 B1* | 9/2020 | Badizadegan | G06F 13/4291 |
| 2004/0177162 A1* | 9/2004 | Wetzel | H04L 9/40 |
| | | | 709/236 |
| 2006/0083266 A1* | 4/2006 | Lim | H04L 69/24 |
| | | | 370/503 |
| 2008/0159330 A1 | 7/2008 | Deng | |
| 2011/0200051 A1* | 8/2011 | Rivaud | H04L 12/413 |
| | | | 370/503 |

* cited by examiner

*Primary Examiner* — Henry Tsai
*Assistant Examiner* — Kim T Huynh
(74) *Attorney, Agent, or Firm* — WPAT, P.C

(57) ABSTRACT

An apparatus for synchronous Ethernet comprises a processor, a field programmable gate array, a synchronizer, a physical layer implementor and a media accessing controller, wherein, the processor transmits a control data through a first transmission interface; the field programmable gate array receives the control data, generates a control instruction in accordance with the control data and transmits the control instruction through a second transmission interface; the synchronizer receives the control instruction and generates a synchronous clock in accordance with the control instruction; and each of the physical layer implementor and the media accessing controller receives and works in accordance with the synchronous clock and media accessing control protocol.

5 Claims, 3 Drawing Sheets

APPARATUS FOR SYNCHRONOUS ETHERNET

FIELD OF THE INVENTION

The present invention relates to a network apparatus, and more particularly to an apparatus for synchronous Ethernet.

BACKGROUND OF THE INVENTION

In the past decades, data are transmitted in non-synchronous ways over Ethernet. However, with rapid growth of the 5G network, it is necessary to bring synchronization designs into the Ethernet to make the Ethernet be compatible with the 5G network. Nowadays, synchronous Ethernet (SyncE) and IEEE 1588v2 standard are the ways to realize Ethernet synchronization, wherein, the synchronous Ethernet is a result obtained by migrating synchronous network architecture, such as plesiochronous digital hierarchy (PDH), synchronous digital hierarchy (SDH), or synchronous optical networking (SONET), to a packet switching network (PSN) basing on the Ethernet, and the IEEE 1588v2 standard defines a precision time protocol (PTP) such that a synchronous clock could exist in the network.

At present, it can be found on the market that a product realizes Ethernet synchronization is to integrate the technologies related to synchronization into an integrated circuit chip, which would be further connected to a processor and deal with all operations realizing Ethernet clock synchronization. Although it is convenient for users to realize Ethernet synchronization by using the integrated circuit chip described above, the integrated circuit chip prevents components therein being customized set by users, so that possibilities of cooperation with other technologies are reduced and further development of synchronous Ethernet is limited. Therefore, a product which could realize Ethernet clock synchronization in a more flexible way is needed.

SUMMARY OF THE INVENTION

Accordingly, the present invention discloses, in specification and related drawings described below, an apparatus for synchronous Ethernet to provide another technical solution to realize clock synchronization over the Ethernet.

In one aspect, the present invention provides an apparatus for synchronous Ethernet, which is adapted to be communicated with an Ethernet. The apparatus comprises a processor, a field programmable gate array, a synchronizer, a physical layer implementor and a media accessing controller, wherein, the processor transmits a control data through a first transmission interface; the field programmable gate array is electrically coupled to the processor through the first transmission interface to receive the control data, generates a control instruction in accordance with the control data, and transmits the control instruction through a second transmission interface; the synchronizer is electrically coupled to the field programmable gate array through the second transmission interface to receive the control instruction, and determines a content of a parameter set of a synchronous clock generated by the synchronizer in accordance with the received control instruction; the physical layer implementor is electrically coupled to the synchronizer to receive the synchronous clock, and receives an incoming network data from or transmitting an outgoing network data to the Ethernet in accordance with the synchronous clock; and the media accessing controller is electrically coupled to the synchronizer and the physical layer implementor, receives the synchronous clock from the synchronizer, and receives the incoming network data from or transmitting the outgoing network data to the physical layer implementor in accordance with the synchronous clock and media accessing control protocol.

In one embodiment, the first transmission interface is peripheral component interconnect express (PCIe) interface.

In one embodiment, the second transmission interface is inter-integrated circuit ($I^2C$) interface.

In one embodiment, the field programmable gate array comprises a register set adapted to store the control data, and a timer adapted to count time and store a counting value, wherein, when the received control data transmitted from the processor is used for controlling the synchronizer to change the content of the parameter set, the timer is activated in accordance with the received control data and number of times the timer being activated is stored as the counting value by the field programmable gate array; wherein, the counting value corresponding to a parameter adjusting strategy is read by the processor when clock synchronous requirements of the Ethernet are met by the apparatus by adjusting the parameter set in accordance with the parameter adjusting strategy, and, after reading a plurality of the counting values, the parameter adjusting strategy corresponding to a minimum of the counting values is selected by the processor to adjusting the parameter set thereafter.

In one embodiment, when the field programmable gate array does not receive the control data used for controlling the synchronizer to change the content of the parameter set within a predetermined time length since the timer being activated, an interrupt is generated by the field programmable gate array to inform the processor to read the counting value.

By applying the technique solutions described above, the apparatus for synchronous Ethernet provided by the present invention makes it possible for the users to adjust parameters, which are used by the synchronizer for generating the clock signal, in accordance with their own design. Comparing with the existing solution which integrates all components into one integrated circuit chip, more design flexibility is allowed in the technology proposed by the present invention.

DETAILED DESCRIPTION OF PREFERRED EMBODIMENTS

It is noted that the term "one component electrically coupled to another component" used in this specification represents that electronic signals could be transmitted between the two components. The electronic signals could be transmitted by either wire or wireless and in either unidirectional or bidirectional unless further limitation is added.

Figure 1:
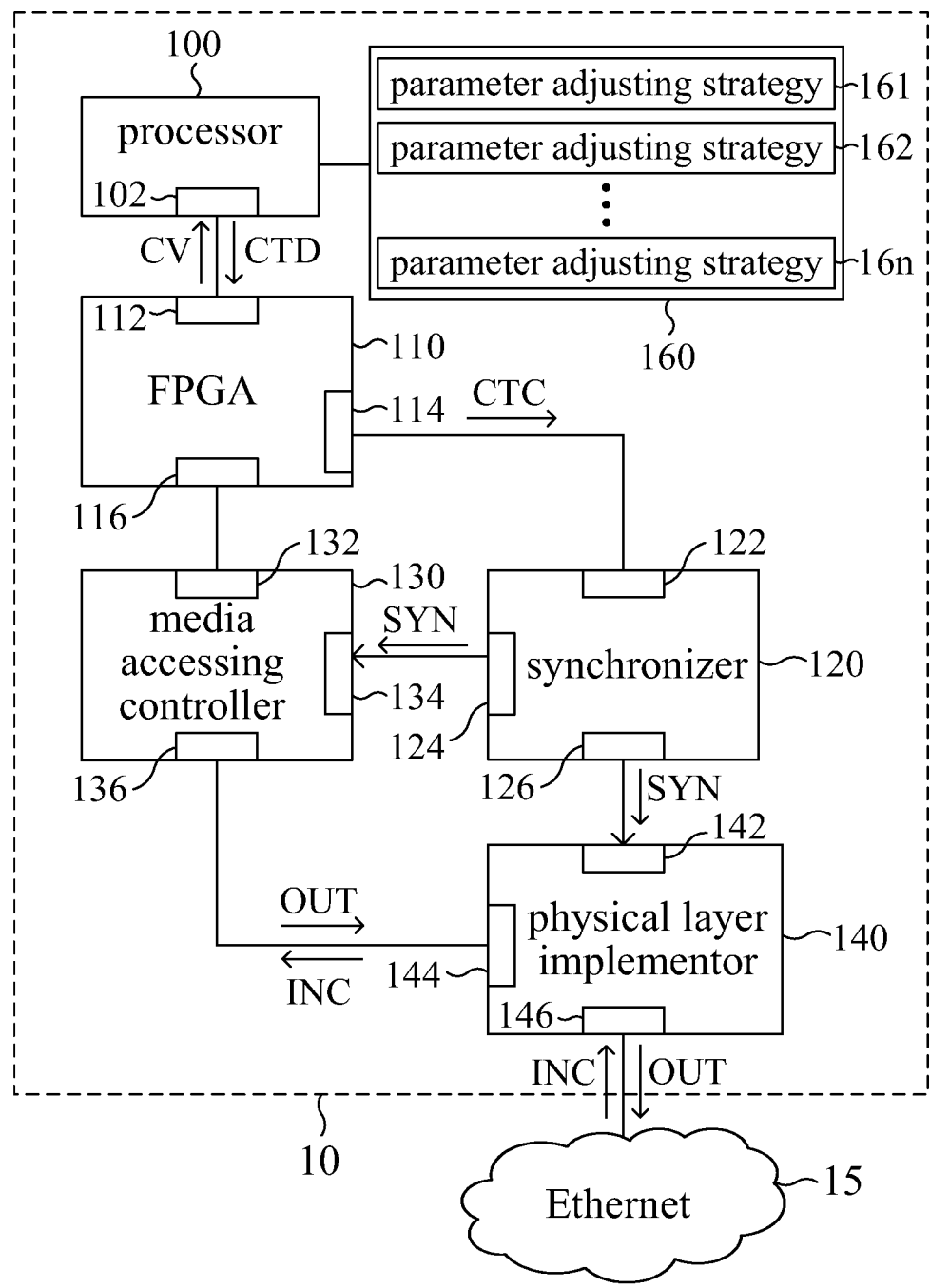
FIG. 1 is a circuitry block diagram of an apparatus for synchronous Ethernet in accordance with one embodiment of the present invention.

Please refer to FIG. 1, which is a circuitry block diagram of an apparatus for synchronous Ethernet in accordance with one embodiment of the present invention. The apparatus 10 shown in this embodiment could be any equipment which can exchange data with Ethernet 15, such as desktop computer, network switch, network router or smart phone. As shown in FIG. 1, the apparatus 10 comprises a processor 100, a field programmable gate array (FPGA) 110, a synchronizer 120, a media accessing controller 130 and a physical layer implementor 140, wherein, the processor 100 is electrically coupled to the FPGA 110, the FPGA 110 is further electrically coupled to the synchronizer 120 and the media accessing controller 130, the synchronizer 120 is further electrically coupled to the media accessing controller 130 and the physical layer implementor 140, and the media accessing controller 130 is electrically coupled to the physical layer implementor 140.

In this embodiment, a connection port 102 on the processor 100 and a connection port 112 on the FPGA 110 each conforms to a first transmission interface so that electronic data could be transmitted between the processor 100 and the FPGA 110 through the connection port 102 and 112 under the transmission control protocol defined for the first transmission interface. Similarly, a connection port 114 on the FPGA 110 and a connection port 122 on the synchronizer 120 each conforms to a second transmission interface so that electronic data could be transmitted between the FPGA 110 and the synchronizer 120 through the connection port 114 and 122 under the transmission control protocol defined for the second transmission interface; a connection port 116 on the FPGA 110 and a connection port 132 on the media accessing controller 130 each conforms to a third transmission interface so that electronic data could be transmitted between the FPGA 110 and the media accessing controller 130 through the connection port 116 and 132 under the transmission control protocol defined for the third transmission interface; a connection port 124 on the synchronizer 120 and a connection port 134 on the media accessing controller 130 each conforms to a fourth transmission interface so that electronic data could be transmitted between the synchronizer 120 and the media accessing controller 130 through the connection port 124 and 134 under the transmission control protocol defined for the fourth transmission interface; a connection port 126 on the synchronizer 120 and a connection port 142 on the physical layer implementor 140 each conforms to a fifth transmission interface so that electronic data could be transmitted between the synchronizer 120 and the physical layer implementor 140 through the connection port 126 and 142 under the transmission control protocol defined for the fifth transmission interface; a connection port 136 on the media accessing controller 130 and a connection port 144 on the physical layer implementor 140 each conforms to a sixth transmission interface so that electronic data could be transmitted between the media accessing controller 130 and the physical layer implementor 140 through the connection port 136 and 144 under the transmission control protocol defined for the sixth transmission interface; and a connection port 146 on the physical layer implementor 140 is adapted to be connected with the Ethernet 15 so that electronic data could be transmitted between the physical layer implementor 140 and the Ethernet 15 through the connection port 146.

Each of the first to sixth transmission interfaces could be, but not limited to, one of the transmission interfaces built in apparatus 10, such as peripheral component interconnect express (PCIe) interface or inter-integrated circuit ($I^2C$) interface.

Figure 2:
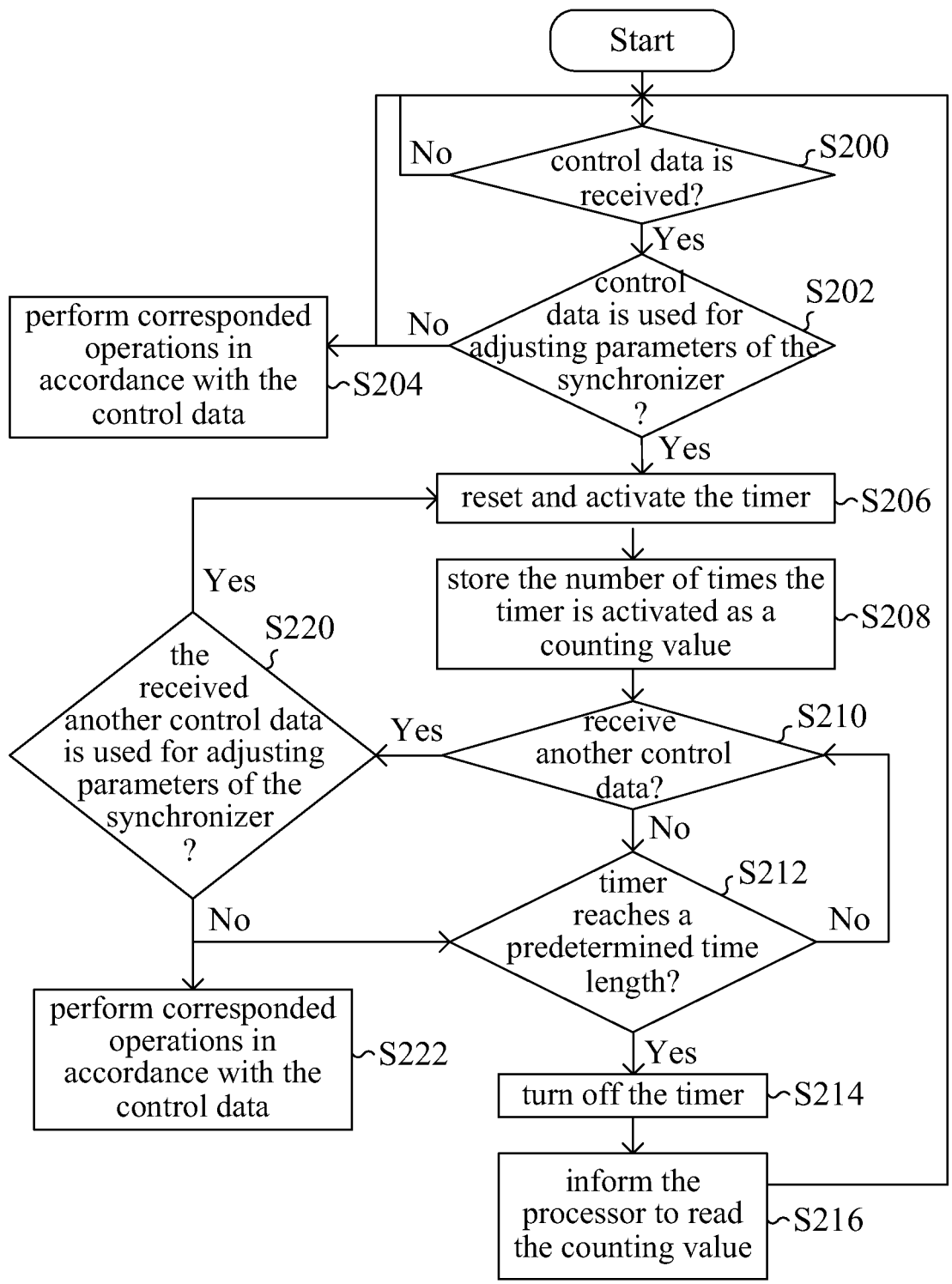
FIG. 2 is an operation flow chart of an apparatus for synchronous Ethernet in accordance with one embodiment of the present invention.

In order to make the technique solutions provided by the present invention to be easily understood, the description made below refers to both FIG. 1 and FIG. 2, wherein FIG. 2 is an operation flow chart of apparatus 10 in accordance with one embodiment of the present invention.

As known by those with ordinary skill in the art, after connecting the apparatus 10 to the Ethernet 15, a clock synchronization operation could be performed by the apparatus 10 to synchronize the clock of the apparatus 10 with other apparatuses over the Ethernet 15. In the present embodiment, the processor 100 emits control data CTD for controlling the synchronizer 120 to perform operations for synchronizing clock between apparatus 10 and other apparatuses over the Ethernet 15.

The control data CTD emitted from the processor 100 and used for controlling operations of the synchronizer 120 is transmitted to the FPGA 110 through the first transmission interface, such as the PCIe interface mentioned above, after the apparatus 10 is activated. The FPGA 110 could, but not limited to, reset data therein immediately after the apparatus 10 is activated. While the apparatus 10 is operating and after the FPGA 110 determines that a control data CTD is received (Step S200), contents of the control data CTD is checked by the FPGA 110 to determine whether the control data CTD is used for adjusting parameters of the synchronizer 120 for realizing clock synchronization (Step S202). When the received control data CTD is not used for adjusting parameters of the synchronizer 120, corresponded operations are performed by the FPGA 110 in accordance with the contents of the control data CTD (Step S204), such as providing related data to the processor 100 or forwarding related data to the media accessing controller 130, and the FPGA 110 is kept for waiting to receive next control data. On the contrary, when the received control data CTD is used for adjusting parameters of the synchronizer 120, a timer built in the FPGA 110 is activated to calculate a time length passed since the timer is activated, wherein the timer could be reset to zero before being activated (Step S206).

After activating the timer, the FPGA 110 stores the number of times the timer is activated as a counting value (Step S208) and determines whether another control data is received before a predetermined time length, for example 1 minute, is passed since the timer is activated (Step S210 and Step S212). When another control data is received before the predetermined time length is passed since the timer is activated, the received another control data is checked by the FPGA 110 to determine whether the received another control data is used for adjusting parameters of the synchronizer 120 for realizing clock synchronization (Step S220). When the result of the determination performed in Step S220 is true, the present embodiment goes back to the Step S206 to re-activate and, in some cases, reset the timer before re-activation, and, after the timer is re-activated, the counting value is added by one and operations for calculating the predetermined time length is re-performed (Step S210, Step S212). On the contrary, when the result of the determination performed in Step S220 is false, that is the received another control data is not used for adjusting the parameters of the synchronizer for realizing clock synchronization, corresponded operations are performed by the FPGA 110 in accordance with the received another control data (Step S222), and the FPGA 110 is kept waiting for receiving any further control data before the predetermined time length is passed since the control data is received (Step S212, Step S210).

When the predetermined time length is reached and the FPGA 110 does not receive any further control data used for adjusting the parameters of the synchronizer 120 to realize clock synchronization, i.e., the determination result of Step S212 is true, the timer is turned off (Step S214) and an interrupt is issued by the FPGA 110 to inform the processor 100 to read the counting value CV stored in the FPGA 110 (Step S216).

Figure 3:
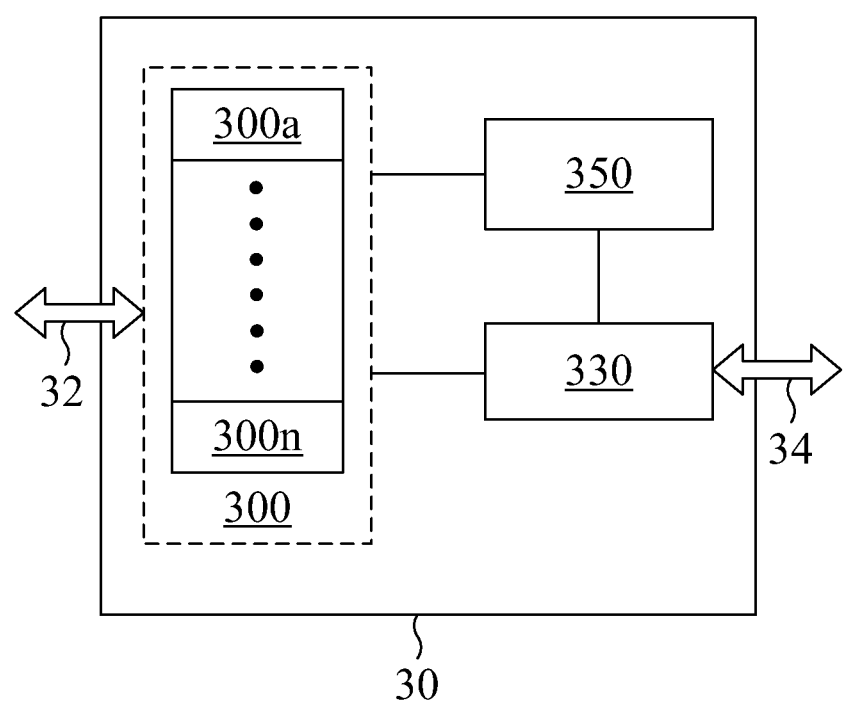
FIG. 3 is a circuitry block diagram of a field programmable gate array (FPGA) in accordance with one embodiment of the present invention.

In order to make FPGA 110 be capable of completing the operations described in FIG. 2, a register set and a timer could be arranged in the FPGA 110 as shown in FIG. 3. Please refer to both the FIG. 1 and FIG. 3, the FPGA 30 in this embodiment comprises a register set 300, a processor 330 and a timer 350, wherein the register set 300 is electrically coupled to the processor 100 through the first transmission interface 32, and the processor 330 is electrically coupled to the synchronizer 120 through the second transmission interface 34 and further is electrically coupled to the register set 300 and the timer 350. In this embodiment, the control data CTD could be written into the register set 300 by the processor 100 through the first transmission interface 32. Contents of the register set 300 could be read and the control instructions CTC corresponding to the read contents are generated and issued to corresponded destinations, such as the synchronizer 120, through corresponded transmission interfaces, such as the second transmission interface 34, by the processor 330. As known by those with ordinary skill in the art, the FPGA 30 could provide further functions, such as transmitting data between the FPGA 30 and the media accessing controller 130, storing the counting value by using the timer 350, and providing the counting value to the processor 100 in accordance with requests issued from the processor 100. Because these further functions could be completed by the techniques used nowadays, they are not specifically discussed in this description.

Furthermore, because the first transmission interface 32 and the second transmission interface 34 each could be any one of the transmission interfaces adapted to the apparatus 10, there are many possible designs for implementing the FPGA 30. In this embodiment, a possible design of the FPGA 30 is implemented by using the PCIe interface as the first transmission interface and using the I²C interface as the second transmission interface, and, therefore, the FPGA 30 works as a relay station between the PCIe interface and the I²C interface. It should be understood by those with ordinary skill in the art that FPGA 30 could be implemented in many ways but not limited to the details shown in FIG. 3.

As shown in FIG. 3, the register set in this embodiment comprises a plurality of registers 300a~300n, which are used for storing the control data CTD transmitted from the processor 100. Furthermore, the processor 330 could read data from or write data into the registers 300a~300n. Because each of the registers 300a~300n is corresponded to a PCIe address, storing the control data CTD into each of the registers 300a~300n from the processor 100 is realized by writing the control data CTD to the corresponded PCIe address. Table 1 shown below represents an embodiment of the PCIe addresses and functionalities corresponding to the register set 300.

TABLE 1

| PCIe address | Functionality | Function Description | |
|---|---|---|---|
| 0x10000 | I²C Function Setting | [31:24] | Number of byte |
| | | [23:16] | Address Offset |
| | | [15:8] | Write/Read |
| | | [7:0] | Device ID |
| 0x10004 | I²C Bus Frequency Setting | [31:24] | Reserved |
| | | [23:16] | Reserved |
| | | [15:8] | Reserved |

TABLE 1-continued

| PCIe address | Functionality | Function Description | |
|---|---|---|---|
| | | [7:0] | Frequency Setting |
| 0x10008 | I²C Activation Setting | [31:24] | Reserved |
| | | [23:16] | Reserved |
| | | [15:8] | Reserved |
| | | [7:0] | Activate/Deactivate |
| 0x1000C | Read I²C State | [31:24] | Reserved |
| | | [23:16] | Reserved |
| | | [15:8] | Reserved |
| | | [7:0] | Device Status |
| 0x10018 | PTP Dynamic Tuning State | [31:24] | Reserved |
| | | [23:16] | Reserved |
| | | [15:8] | Reserved |
| | | [7:0] | PTP Status |
| 0x10100 | Write Data Byte 1~4 | [31:24] | Byte 4 |
| | | [23:16] | Byte 3 |
| | | [15:8] | Byte 2 |
| | | [7:0] | Byte 1 |
| 0x10104 | Write Data Byte 5~8 | [31:24] | Byte 8 |
| | | [23:16] | Byte 7 |
| | | [15:8] | Byte 6 |
| | | [7:0] | Byte 5 |
| . | | | |
| . | | | |
| 0x101FC | Write Data Byte 253~256 | [31:24] | Byte 256 |
| | | [23:16] | Byte 255 |
| | | [15:8] | Byte 254 |
| | | [7:0] | Byte 253 |
| 0x10200 | Read Data Byte 1~4 | [31:24] | Byte 4 |
| | | [23:16] | Byte 3 |
| | | [15:8] | Byte 2 |
| | | [7:0] | Byte 1 |
| 0x10204 | Read Data Byte 5~8 | [31:24] | Byte 8 |
| | | [23:16] | Byte 7 |
| | | [15:8] | Byte 6 |
| | | [7:0] | Byte 5 |
| . | | | |
| . | | | |
| 0x102FC | Read Data Byte 253~256 | [31:24] | Byte 256 |
| | | [23:16] | Byte 255 |
| | | [15:8] | Byte 254 |
| | | [7:0] | Byte 253 |

It is noted that, in this embodiment, the content stored within bit 31 to 24 of the register of which the PCIe address is 0x10000 is used for informing the processor 330 about the quantity of byte. For example, 0x00 is written into the bits between bit 31 to 24 of the 0x10000 register when there is a 1-byte data to be dealt with by the FPGA 30, 0x01 is written into the bits between bit 31 to 24 of the 0x10000 register when there is a 2-byte data to be dealt with by the FPGA 30, and 0xff is written into the bits between bit 31 to 24 of the 0x10000 register when there is a 256-byte data to be dealt with by the FPGA 30. Moreover, the content stored within bit 15 to 8 of the same register is used for informing the processor 330 about operations to be performed. For example, 0x00 is written into the bits between bit 15 to 8 of the 0x10000 register when the operation to be performed is write, and 0x01 is written into the bits between bit 15 to 8 of the 0x10000 register when the operation to be performed is read. Furthermore, the content stored within bit 7 to 0 of the register of which the PCIe address is 0x10004 is used for informing the processor 330 about the frequency to be used by the I²C interface. For example, 0x04 is written into the bits between bit 7 to 0 of the 0x10004 register when the frequency to be used by the I²C interface is 400 KHz, and 0x10 is written into the bits between bit 7 to 0 of the 0x10004 register when the frequency to be used by the I²C interface is 100 KHz. It is understood by those with ordinary skill in the art that the number led by 0x is a hexadecimal number, and therefore is not discussed in detail herein.

The interaction between the processor 100 and the FPGA 30 is briefly described below with some embodiments.

In this embodiment, it is assumed that the I²C device ID of the synchronizer 120 is 0x15. When a 1-byte data is going to be written into an address which is with a 0x03 address offset of the I²C register of the synchronizer 120, a first operation is performed by the processor 100 to write a first data into the register whose PCIe address is 0x10000. The first data comprises: a hexadecimal 0x00 to be written into the bits between bit 31 to 24 ([31:24]) for representing that the data to be dealt with is a 1-byte data, a hexadecimal 0x03 to be written into the bits between bit 23 to 16 ([23:16]) for representing that the address offset is 0x03, a hexadecimal 0x00 to be written into the bits between bit 15 to 8 ([15:8]) for representing that the operation to be performed is a write operation, and a hexadecimal 0x15 to be written into the bits between bit 7 to 0 ([7:0]) for representing that the I²C device ID of the target to be dealt with, i.e., the synchronizer 120, is 0x15.

Besides the first operation, a second operation is performed by the processor 100 to write a second data to the register whose PCIe address is 0x10004 for setting the operation frequency of the I²C interface. For example, hexadecimal 0x00 is written into the bits between bit 31 to 8 ([31:24], [23:16], [15:8]) while hexadecimal 0x10 is written into the bits between bit 7 to 0 ([7:0]) for requesting to operate the I²C interface with 100 KHz frequency.

Besides the first and second operation, a third operation is also performed by the processor 100 to write a third data into the register whose PCIe address is 0x10100 for sending at least a part of the third data to the synchronizer 120. The third data comprises: hexadecimals 0x00 to be written into the bits between bit 31 to 8 ([31:24], [23:16], [15:8]) and a hexadecimal 0xAA to be written into the bits between bit 7 to 0 ([7:0]) so that the hexadecimal 0xAA could be transmitted to the synchronizer 120 later.

After completing the first, second and third operations, a fourth operation is performed by the processor 100 to write a fourth data into the register whose PCIe address is 0x10008 for informing the FPGA 110 that operations for data transition from PCIe to I²C should be initiated. The fourth data comprises: hexadecimals 0x00 to be written into the bits between bit 31 to 8 ([31:24], [23:16], [15:8]) and a hexadecimal 0x01 to be written into the bits between bit 7 to 0 ([7:0]) for informing that the I²C bus should be activated to transmit data.

After completing the fourth operation, a fifth operation is performed by the processor 100 to read contents stored in the register whose PCIe address is 0x1000C for determining whether the operations performed over the I²C bus are finished. In this embodiment, the bits between bit 7 to 0 ([7:0]) of the register whose PCIe address is 0x1000C are set to hexadecimal 0x01 by the processor 330 when the I²C bus is busy. On the contrary, the bits between bit 7 to 0 ([7:0]) of the register whose PCIe address is 0x1000C are set to hexadecimal 0x00 by the processor 330 when the I²C bus is free. Accordingly, the processor 100 determines that the operations performed over the I²C bus, i.e., writing data to the synchronizer 120, are completed when the hexadecimal read in the fifth operation is 0x00. It is noted that, in another embodiment, the processor 100 could be automatically informed by the processor 330 when the processor 330 finishes the operations over the I²C bus.

Similarly, in order to require data from the synchronizer 120, the first and second operations described above could be performed in accordance with the parameters comprising the amount of the required data, the address offset of the required data in the synchronizer 120, types of the operation, the device ID of the synchronizer 120, operation frequency of the I²C bus, and etc. After completing the first and second operations, the fourth operation mentioned above is performed to write control data to the register whose PCIe address is 0x100008 so that the FPGA 30 is informed to initiate data transition. After informing the FPGA 30 to initiate data transition over the I²C bus, the fifth operation is performed by the processor 100 for determining whether the operations performed over the I²C bus are completed. Finally, the required data could be read by the processor 100 from the register whose PCIe address is when the processor 100 knows that the operations over the I²C bus are completed.

By using the technique solutions described above, data transmission between the processor 100 and the synchronizer 120 could be easily completed. Please refer to FIG. 1 again, in this embodiment, the synchronizer 120 is an electronic device which generates a clock signal in response to the parameters set therein. For easier understanding, the generated clock signal is referred to as synchronous clock. In this embodiment, the synchronous clock SYN generated by the synchronizer 120 is provided to the media accessing controller 130 and the physical layer implementor 140, respectively. The media accessing controller 130 transmits an outgoing network data OUT to the physical layer implementor 140 in accordance with the synchronous clock SYN and the media accessing control (MAC) protocol built therein, and the physical layer implementor 140 transmits the outgoing network data OUT to the Ethernet 15 under control of the media accessing controller 130 in accordance with the synchronous clock SYN received from the synchronizer 120. In another aspect, the physical layer implementor 140 receives an incoming network data INC from the Ethernet 15 under control of the media accessing controller 130 in accordance with the synchronous clock SYN received from the synchronizer 120, and the media accessing controller 130 receives the incoming network data INC from the physical layer implementor 140 in accordance with the synchronous clock SYN and the MAC protocol. It is noted that, because the media accessing controller 130 and the physical layer implementor 140 performs the functions conforming to the existed MAC protocol and network physical layer, they could be realized by the existed technologies including software, hardware, or firmware and should be familiar to those with ordinary skill in the art so that they are not described in detail here.

After completion of providing the control data CTD to FPGA 110 and the operations over I²C interface, comprising generating the control instruction CTC in accordance with the control data CTD and adjusting the contents of the parameter set in accordance with the control instruction CTC, a polling operation is performed by the processor 100 to determine whether the apparatus 10 meets the requirements made by the precision time protocol (PTP). That is, the apparatus 10 is checked to determine whether the requirements of synchronous Ethernet (SyncE) are met. When, according to the result of the polling operation, the requirements of SyncE are determined to be not fully met by the apparatus 10, a different synchronous clock could be generated by the synchronizer 120 in accordance with a different content of the parameter set adjusted by a different control instruction generated corresponding to a different control data provided by the processor 100 in accordance with one of the parameter adjusting strategies 160, 161 . . .

16*n* stored in the memory device 160. It is noted that the memory device 160 is electrically coupled to the processor 100, there could be at least one parameter adjusting strategy stored in the memory device 160, and, each of the parameter adjusting strategies could be amended, added or deleted by users. On the contrary, when the requirements of SyncE are determined to be fully met by the apparatus 10, it is not necessary to provide a different control data from the processor 10 for adjusting the synchronous clock generated by the synchronizer 120.

Furthermore, because the operations for synchronizing clocks over Ethernet might be performed every time when the apparatus 10 is activated, it is also very important to reduce the time length needed for meeting the requirements of SyncE. As described above, the timer 350 would be re-activated because of the contents of the parameter set stored in the synchronizer 120 being adjusted due to the new control data received from the processor 100, and, as a result, the counting value is increased by 1 per re-activation. Therefore, by applying the technique solutions provided by the embodiments described above, different parameter adjusting strategies, each of which adjusts the contents of the parameter set in a way different from that of other parameter adjusting strategies, could be provided in the memory device 160 or provided by the software run by the processor 100, and one of the parameter adjusting strategies is selected and applied by the processor 100 to adjust the contents of the parameter set in a corresponded way until the requirements of SyncE are met. When the requirements of SyncE are met by applying the selected parameter adjusting strategy to the processor 100, a counting value corresponding to the selected parameter adjusting strategy could be obtained accordingly. Finally, a parameter adjusting strategy with shortest time length for achieving clock synchronization could be found by comparing the counting values each corresponding to one of the parameter adjusting strategies.

For example, assuming the time interval between two polling operations is constant, the requirements of SyncE are met by the apparatus 10 after the control data are adjusted for 30 times in accordance with the parameter adjusting strategy 161 by the processor 100 and met by the apparatus 10 after the control data are adjusted 20 times in accordance with the parameter adjusting strategy 162 by the processor 100, the parameter adjusting strategy 162 would be selected by the processor 100 as the parameter adjusting strategy used thereafter after comparing the two counting values corresponding to the parameter adjusting strategy 161 and the parameter adjusting strategy 162.

In another example, when the time interval between two polling operations could be varied, the total time length counted by the timer 350 could be also taken into consideration of selecting the parameter adjusting strategy.

Accordingly, the timer 350 and the counting value are auxiliary tools that make it easier for the technician to determine a best one of the parameter adjusting strategies with shortest time length needed for achieving clock synchronization over Ethernet. Based on the premise that it is not necessary to select one of the parameter adjusting strategies, the timer 350 could be omitted and the flowchart shown in FIG. 2 could be simplified. Because the modifications of the omitting and simplifying could be made by those with ordinary skill in the art basing on the descriptions made above, they are not illustrated and described in this specification.

Moreover, although the number of the activation of the timer and the counted time length are used as the auxiliary tools for strategy selection in the embodiments above, other implementations, such as new software or firmware, could be made by referring to the technique solutions described herein to decide how the parameter set is adjusted. The present invention is not limited by those described above.

In summary, by applying the technique solutions described above, the apparatus for synchronous Ethernet provided by the present invention makes it possible for the users to adjust parameters used by the synchronizer for generating the clock signal in accordance with their own design. Comparing with the existing solution which integrates all components into one integrated circuit chip, more design flexibility is allowed in the technique solution proposed by the present invention.

What is claimed is:

1. An apparatus for synchronous Ethernet, which is adapted to be communicated with an Ethernet, comprising:
 a processor, sending out a control data through a first transmission interface;
 a field programmable gate array, electrically coupled to the processor through the first transmission interface to receive the control data, generating a control instruction in accordance with the control data, and transmitting the control instruction through a second transmission interface;
 a synchronizer, electrically coupled to the field programmable gate array through the second transmission interface to receive the control instruction generated by the field programmable gate array, and determining a content of a parameter set of a synchronous clock generated by the synchronizer in accordance with the received control instruction;
 a physical layer implementor, electrically coupled to the synchronizer to receive the synchronous clock, and receiving an incoming network data from or transmitting an outgoing network data to the Ethernet in accordance with the synchronous clock; and
 a media accessing controller, electrically coupled to the synchronizer and the physical layer implementor, receiving the synchronous clock from the synchronizer, and receiving the incoming network data from or transmitting the outgoing network data to the physical layer implementor in accordance with the synchronous clock and media accessing control protocol.

2. The apparatus of claim 1, wherein the first transmission interface is peripheral component interconnect express interface.

3. The apparatus of claim 1, wherein the second transmission interface is inter-integrated circuit interface.

4. The apparatus of claim 1, wherein the field programmable gate array comprises:
 a register set adapted to store the control data; and
 a timer adapted to count time and store a counting value;
 wherein, when the received control data transmitted from the processor is used for controlling the synchronizer to change the content of the parameter set, the timer is activated in accordance with the received control data and number of times the timer being activated is stored as the counting value by the field programmable gate array;
 wherein, the counting value corresponding to a parameter adjusting strategy is read by the processor when clock synchronous requirements of the Ethernet are met by adjusting the parameter set in accordance with the parameter adjusting strategy, and, after reading a plurality of the counting values, the parameter adjusting strategy corresponding to a minimum of the counting values is selected by the processor to adjusting the parameter set thereafter.

5. The apparatus of claim 4, wherein when the field programmable gate array does not receive the control data used for controlling the synchronizer to change the content of the parameter set within a predetermined time length since the timer being activated, an interrupt is generated by the field programmable gate array to inform the processor to read the counting value.

* * * * *